Sept. 4, 1934.   C. W. CHAPMAN   1,972,643
FRICTION CLUTCH
Filed Oct. 14, 1931   2 Sheets-Sheet 1
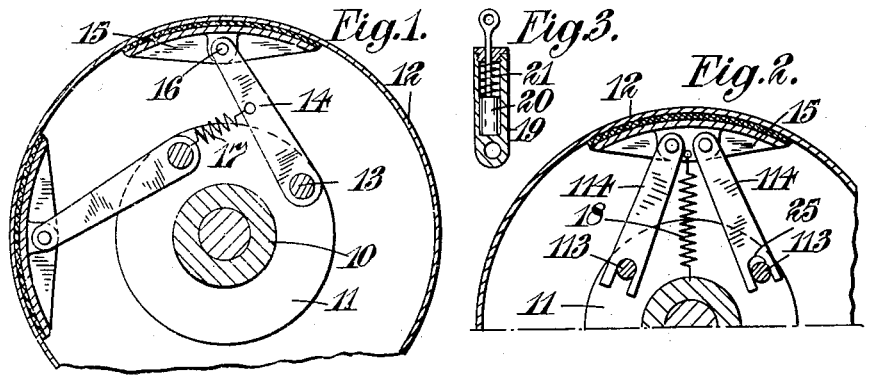
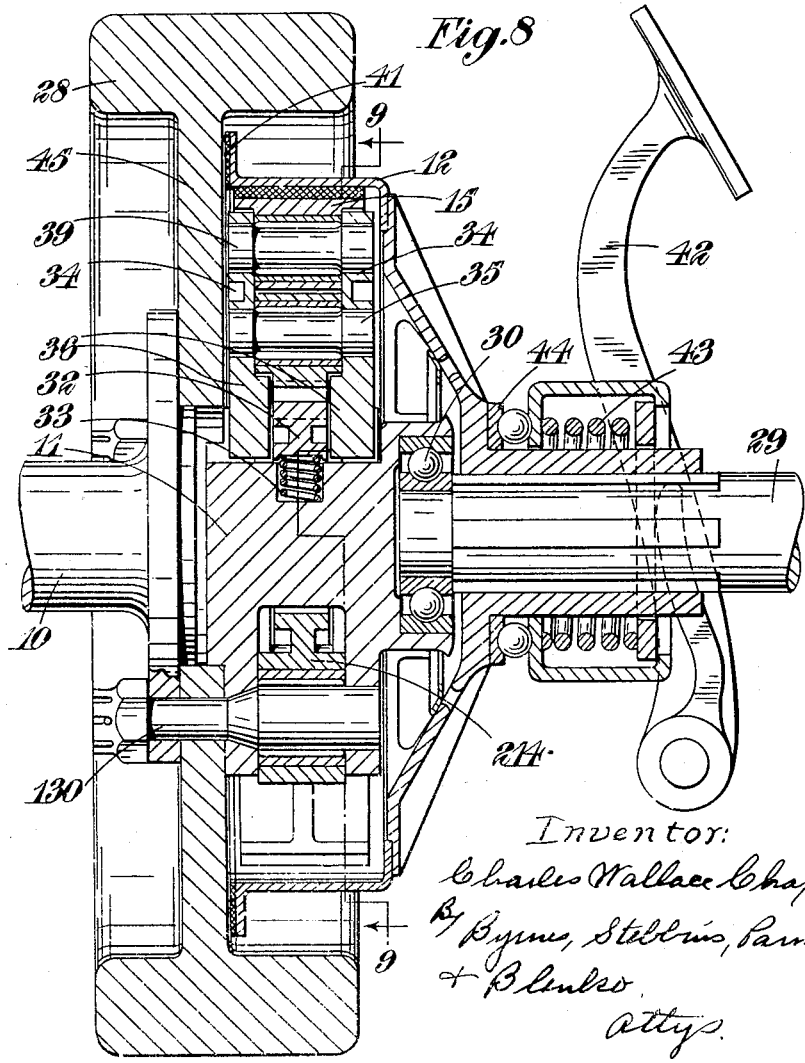
Inventor:
Charles Wallace Chapman,
By Byrnes, Stebbins, Parmelee
& Blenko,
attys.

Sept. 4, 1934.  C. W. CHAPMAN  1,972,643
FRICTION CLUTCH
Filed Oct. 14, 1931   2 Sheets-Sheet 2
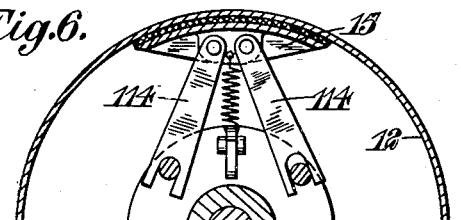
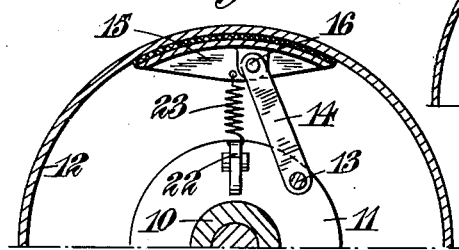
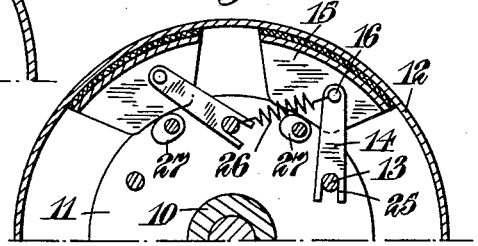
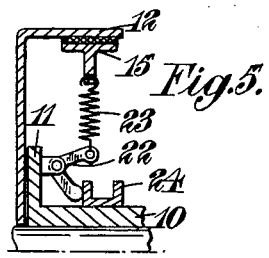
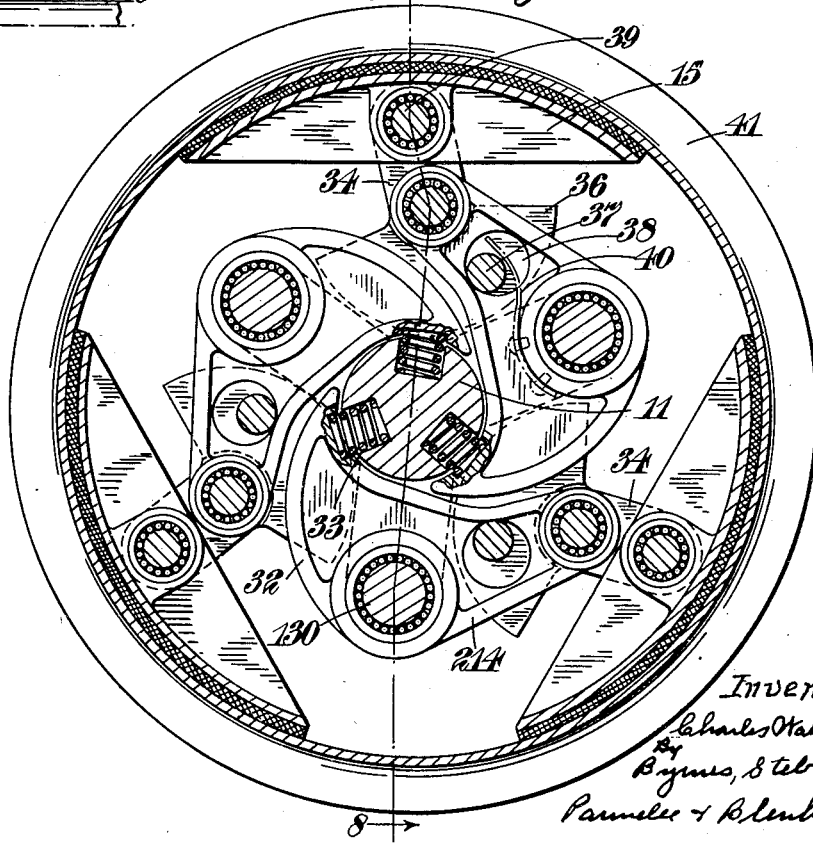

Patented Sept. 4, 1934

1,972,643

UNITED STATES PATENT OFFICE 1,972,643

FRICTION CLUTCH

Charles Wallace Chapman, Strood, Kent, England, assignor of one-half to Francis Arthur Perkins, Kent, England Application October 14, 1931, Serial No. 568,851
In Great Britain October 28, 1930

9 Claims. (Cl. 192—105)

This invention is for improvements in or relating to torque transmitting devices of the type comprising a driving member and a driven member, and one or more clutch elements pivoted to the driving member and arranged to be thrown by centrifugal force into engagement with the driven member, which elements are so arranged and dimensioned that normal rotation of the driving member tends to wedge them toward the driven member. In a brake the driven member may be stationary and in a clutch the driven member will rotate. This invention provides a torque transmitting device of the type specified wherein each clutch element comprises an arm pivoted to one member and a shoe pivoted to the free end of the arm and arranged to make contact with the other member, and wherein the tangent of the angle which is included between a line joining the pivot of each arm to the driving member to the point of contact of its shoe with the driven member (or if contact is made over a large area then with the center of pressure) and a line normal to the surface of the driven member at the point of contact (or center of pressure) is greater than the maximum kinetic co-efficient of friction.

By keeping the angle greater than the kinetic co-efficient of friction we are enabled to avoid shock in taking up the drive and yet retain the valuable feature that the pressure of the driving element on the shoes tends to assist the centrifugal force in taking up the drive. Moreover, by this means, on "overrunning" a freewheel action is facilitated. The present invention does not extend to cases where the operative direction of rotation is such that the driving member tends to pull the shoe behind it, as in such cases no wedging action takes place.

By the expression "kinetic co-efficient of friction" is meant that co-efficient of friction of the materials used which obtains when there is relative movement between the two surfaces which are in frictional engagement.

Various constructions of clutches according to this invention will now be described in detail by way of example with reference to the accompanying drawings, in which:—

Figure 1 shows one construction of clutch;

Figure 2 shows a modified construction;

Figure 3 is a detail showing an alternative method of mounting the shoe 15 slidably with respect of the pin 113 in the arrangement shown in Figure 2;

Figures 4 and 5 show in elevation and in section respectively a further modification;

Figure 6 shows a modification of the construction shown in Figures 4 and 5;

Figure 7 shows a still further modification;

Figure 8 shows in detail a clutch according to this invention, this figure being taken on the line 8—8 in Figure 9, and Figure 9 is a section taken on the line 9—9 in Figure 8.

Throughout this description like reference numerals indicate like parts.

The clutch shown diagrammatically in Figure 1 consists of a driving member 10 provided with a boss 11 and a drum (or driven member) 12. Pivoted on pins 13 on the boss 11 are a number of arms 14, two only of which are shown. The clutch is arranged for rotation of the driving member 10 in an anticlockwise direction, and the arms 14 extend forwardly and outwardly in the direction of rotation. To the free end of each arm a clutch-shoe 15, faced with friction material, is pivoted at 16. A tension spring 17 extends between the pivot 13 of one arm 14 and the point on the adjacent arm midway in the length of the latter. These springs therefore tend to fold the arms 14 down about the centre of the driving member 10.

The operation of the torque transmitting device is as follows:—Assuming the driving member to be rotated in an anticlockwise direction and the driven member to be stationary, the driving member is speeded up until the centrifugal force acting on the clutch elements (each constituted by a pivoted arm and shoe) is sufficient to overcome the force exerted by the tension springs above mentioned. These clutch elements will then be thrown outwards into engagement with the interior of the drum. The drum is therefore caused to tend to rotate (in the case of a clutch) and due to the resisting torque and to the difference in speeds between the driving and driven member, the clutch elements will tend to wedge into firm engagement with the drum; the greater the resisting torque the tighter will they be wedged into engagement. If at any period the driven member over-runs the driving member then the frictional drag will decrease this wedging action, and if the speed of the driving member drops below a certain predetermined value at which the centrifugal force on the clutch elements equals the force exerted by the above mentioned tension springs, then the clutch elements will be moved completely out of engagement with the drum, and the clutch will act as a freewheel.

It can be shown that if the tangent of the angle included between the center lines of the thrust in the arms (which are almost coincident with the lines joining the pivots of the arms with the centers of pressure) and the radius of the drum at the point of contact of this thrust line and the drum is greater than the maximum kinetic coefficient of friction, then the frictional force set up is a function of speed of the driving member so that the torque transmitted increases with engine speed and the drive is taken up gradually and without shock.

If the tangent of the angle above-mentioned is between the static and kinetic co-efficients of friction of the materials used, then the drive will be taken up gradually and without shock, but the drive will not slip when once it is engaged.

If the tangent of the angle is greater than both the kinetic and static co-efficients of friction, not only will the drive be taken up gradually and without shock but overload will cause the clutch to slip, which is an advantage in certain cases.

The device shown in Figure 1 may be utilized as a brake, in which case the driven member will be anchored, say to the framework or chassis of a vehicle.

In the modification shown in Figure 2 the device is arranged to take up the drive in the case of a clutch, or to exert a braking effort in the case of the brake, in either clockwise or anticlockwise directions of rotation. To this end each shoe 15 is pivoted to two arms 114. At their inner ends these arms are provided with slots 25 in which pivot-pins 113 attached to the central boss 11 of the driving member are engaged. The clutch-shoe is drawn down out of contact with the drum 12 by means of a radial tension spring 18. It will be seen that in one direction of rotation one arm will take the thrusts and the other arm slide freely on its pin 113, while in the reverse direction of rotation these conditions will be reversed.

Instead of the slotted arms shown in Figure 2, an arm such as that shown in Figure 3 may be used. This arm consists of a cylinder 19 within which a plunger 20 is slidably mounted, this plunger being spring-pressed towards the bottom end of the cylinder by a compression spring 21. The cylinder 19 will be pivoted to the boss 11 and shaft of the plunger 20 to the shoe 15, or vice versa.

In the modification shown in Figures 4 and 5, for each brake shoe 15 a bell-crank lever 22 is pivoted on the boss 11 of the driving member. One end of this bell-crank lever is joined by a radial tension spring 23 to the shoe 15, while the other is in contact with a collar 24 which is slidably mounted on the driving member. It will be seen that by moving the collar 24 along the driving member, the spring tension tending to hold the shoe out of engagement (and acting in opposition to the centrifugal force of the shoe and its arm) may be varied and therefore a certain manual control of the operation of the clutch or brake may be exercised.

Figure 6 is a modification of the construction shown in Figures 4 and 5 in which two slotted arms 114 are used, so that the clutch or brake will operate automatically in either direction of rotation.

In the modification shown diagrammatically in Figure 7 each shoe 15 is moved out into engagement with the drum 12 by means of a cam 27, thus providing mechanism for bringing these two parts into engagement at low speeds. The shoes are biased away from the drum by means of a tension spring 26 which extends between the pivot 13 of one arm 14 and the pivot 16 of the adjacent shoe.

Figures 8 and 9 show in detail a clutch suitable for use in an automobile. This clutch comprises a driving shaft 10 bolted to a flywheel 28 and a driven member in the form of a drum 12 located concentrically within the flywheel. The drum 12 is mounted for sliding movement upon a shaft 29, the inner end of which is spigotted in a ball-bearing 30 supported in a centre boss 11 of the driving member. This centre boss is bolted to the shaft 10 and to the flywheel 28 by pivot-pins 130; the latter are equally spaced around the centre boss 11 and parallel to its axis, and upon each of them an arm 214 is pivoted (upon antifriction bearings). As viewed in Figure 9, the driving member is arranged for rotation in an anticlockwise direction and the arms 214 extend outwardly and forwardly in the direction of rotation. On the inner end of each arm 214 is a rearwardly inclined extension 32 which, when the arm is fully extended, abuts on the central boss 11. Between each extension 32 and the central boss a compression spring 33 is placed. At the free end of each arm 214 a link 34 (consisting of two cheeks, one on each side of the arm) is pivoted on antifriction bearings on a pivot-pin 35. Each cheek terminates on the inner side of the pivot 35 in a balance-weight 36. Each pair of balance-weights is joined by a stop-pin 37 which passes through a hole 38 in the appropriate arm 214. Between the outer ends of each pair of cheeks constituting a link 34 a clutch-shoe 15 (faced with friction material) is pivoted upon antifriction bearings on a pin 39. The balance-weights 36 counterbalance the weight of the clutch-shoe 15 and the link 34 and pin 39, and the centre of gravity of the shoe, link and balance-weights coincides approximately with the axis of the pin 35.

The action of the clutch is as follows:— With the driving shaft 10 stationary or only revolving at low speeds, the arms 214 are folded round the boss 11 and the shoes 15 held clear of the drum 12. When the speed increases to a value at which centrifugal force overcomes the pressure of the springs 33, the arms fly outwards until the shoes make contact with the drum. At this period the inner extensions 32 of the arms do not touch the central boss 11 of the driving member. The frictional drag on the shoes 15 presses the stop-pins 37 against the inner edge of their appropriate holes 38 in the arms 214, and the links 34 and the arms 214 transmit the drive solidly. By making the balance-weights not quite sufficiently heavy to counterbalance the links and the shoes, centrifugal force will tend to hold the stop-pins 37 in the position shown. Alternatively, or additionally, a light spring 40 (shown in chain-dotted lines in Figure 9) may be employed for this purpose. If the speed of rotation is such that the moment, taken about the pin 35, of the centrifugal force along a line radial from the centre of the driving member through the axis of the pin 35 is greater than the moment (also taken about this pin) of the driving thrust along the centre line of the arm 214, then the arm and the links will tend to straighten out until the inner extension 32 of the arm makes contact with the boss, thus limiting the load upon the pins 130, 35 and 39 and also the bursting effect on the drum. For smooth engagement and take-up of the drive, the tangent of the angle between the line joining the centres of pins 130 and 39 and the radial line through the pin 39 is greater than the maximum kinetic co-efficient of friction.

In order to provide for a non-slipping or self-locking drive when the link 34 and the arm 214 are in the fully extended position, the angle between the center line of link 34 and a radial line through the center of pin 39 is in this case made less than the limiting angle of friction.

The drum 12 is provided with a flange 41 faced with friction material which by means of the pedal 42, compression spring 43 and thrust bearing 44 may be pressed against the central flange 45 of the flywheel 28, in order that the engine may be used as a brake.

It will be appreciated that all the constructions described above with reference to the accompanying drawings embody the feature of centrifugal application of the shoes to the drum assisted by "servo" action of the shoes, and they all embody that relationship between the kinetic co-efficient and the tangent of the angle included between the thrust line (or the line joining the center of pressure and the pivot of the link) and the normal line, specified herein.

I claim:

1. A friction coupling, comprising a drum and a boss within it independently rotatable about the same axis, arms pivoted to said boss around its centre, each arm lying on a non-radial line, a link pivoted to the end of each arm, a shoe pivoted to the end of each link and a balance weight for the shoe on each link, whereof the centre of gravity of each shoe, link and weight coincides approximately with the pivot of the link.

2. In a friction coupling the combination of a driving member and a driven member independently rotatable about the same axis, at least one clutch shoe pivoted to one member for movement into frictional engagement with the other member by centrifugal action, said shoe wedging in one direction of relative rotation between the two members and tending to free in the other direction, auxiliary friction surfaces on the two members, and means for moving said members axially in relation one to the other to engage said auxiliary surfaces.

3. A friction coupling engaging and disengaging automatically with increase and decrease in speed of rotation, comprising the combination of a drum and a rotatable boss concentric therewith, a number of arms pivoted to said boss and extending forwardly and outwardly, shoes attached one to the outer end of each arm and movable by their own centrifugal force into frictional engagement with the drum, and an extension on the inner end of each arm movable into contact with the boss to limit the outward movement of the shoe.

4. In a friction coupling the combination of a drum and a boss concentric therewith and rotatable independently of it, a number of arms pivoted to the boss for movement about axes spaced around but parallel to the axis of rotation of the boss, said arms extending outwards in non-radial attitudes, a link pivoted to the free end of each arm, a shoe pivoted to the free end of each link and movable by centrifugal action into frictional engagement with the drum, and a balance weight on each link on the opposite side of the pivot of the link from the shoe whereof the angle, included between a radial line from the axis of rotation through the pivot of the shoe and the line through the pivot of the shoe and the pivot of the arm, is greater than the limiting angle of friction.

5. In a friction coupling the combination of a drum and a boss concentric therewith and rotatable independently of it, a number of arms pivoted to the boss for movement about axes, spaced around but parallel to the axis of rotation of the boss, said arms extending outwards in non-radial attitudes, a link pivoted to the free end of each arm, a shoe pivoted to the free end of each link and movable by a centrifugal action into frictional engagement with the drum, and a balance weight on each link on the opposite side of the pivot of the link from the shoe, whereof the angle, included between the centre line of a link and a radial line through the pivot of the shoe, is less than the limiting angle of friction.

6. A friction coupling as claimed in claim 4, wherein an abutment is provided upon each of the arms pivoted to the boss to contact with a portion moving with the boss and limit movement of the arm under the influence of centrifugal force exerted upon the link beyond a predetermined extent.

7. A friction coupling as claimed in claim 4, wherein an abutment is provided on each of the arms pivoted to the boss to contact with a part moving with the boss and limit movement of the arm relatively to the boss beyond a predetermined extent and wherein the arm is urged away from the abutment by a spring.

8. In a friction coupling the combination of a drum, a boss concentric therewith and rotatable independently thereof, a plurality of arms pivoted to the boss to move about axes spaced around but extending along the axis of rotation of the boss, said arms extending outwards in non-radial attitudes, abutments upon said arms to engage a part rotating with the boss and limit outward movement of the arms to a predetermined extent and shoes pivotally mounted upon said arms to co-operate with the drum under the influence of centrifugal force.

9. In a friction coupling the combination of a drum, a boss concentric therewith and rotatable independently thereof, a plurality of arms pivoted to the boss to move about axes spaced around but extending along the axis of rotation of the boss, said arms extending outwards in non-radial attitudes, abutments upon said arms to engage a part rotating with the boss and limit outward movement of the arms to a predetermined extent, shoes pivotally mounted upon said arms to co-operate with the drum under the influence of centrifugal force and spring means for opposing said outward movement of said arms.

CHARLES WALLACE CHAPMAN.